(12) United States Patent
Berels et al.

(10) Patent No.: US 12,331,561 B2
(45) Date of Patent: Jun. 17, 2025

(54) LOW-POWER VEHICLE SECURE ACCESS

(71) Applicant: FORD GLOBAL TECHNOLOGIES, LLC, Dearborn, MI (US)

(72) Inventors: David Jeffeory Berels, Plymouth, MI (US); Sheran Anthony Alles, Livonia, MI (US); Stephen Jay Osterhoff, Livonia, MI (US); Otto Shafer, Canton, MI (US); Leann Kridner, New Boston, MI (US); Bhushan Joshi, Canton, MI (US); Zaid Amro, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 379 days.

(21) Appl. No.: 17/671,113

(22) Filed: Feb. 14, 2022

(65) Prior Publication Data

US 2023/0258028 A1    Aug. 17, 2023

(51) Int. Cl.
| | | |
|---|---|---|
| *E05B 81/80* | (2014.01) | |
| *B60R 16/033* | (2006.01) | |
| *G07C 9/00* | (2020.01) | |
| *H02J 7/00* | (2006.01) | |
| *H02J 9/06* | (2006.01) | |

(52) U.S. Cl.
CPC ............ *E05B 81/80* (2013.01); *B60R 16/033* (2013.01); *G07C 9/00174* (2013.01); *G07C 2009/00634* (2013.01); *H02J 7/0048* (2020.01); *H02J 9/06* (2013.01)

(58) Field of Classification Search
CPC ....... E05B 81/80; B60R 16/033; B60R 25/40; B60R 25/20; B60R 25/403; G07C 9/00174; G07C 2009/00634; H02J 7/0048; H02J 9/06; H02J 7/0029; H02J 7/0047; H02J 7/005
See application file for complete search history.

(56) References Cited

U.S. PATENT DOCUMENTS

| | | | |
|---|---|---|---|
| 6,360,624 B1 | 3/2002 | Sedlmaier et al. | |
| 8,958,948 B2 * | 2/2015 | Lange | E05B 81/64 |
| | | | 701/49 |
| 9,725,069 B2 * | 8/2017 | Krishnan | E05B 77/00 |
| 10,294,699 B2 | 5/2019 | Kowalewski et al. | |
| 11,794,694 B2 * | 10/2023 | Elangovan | G06F 3/017 |

(Continued)

FOREIGN PATENT DOCUMENTS

| | | |
|---|---|---|
| DE | 102007010583 B4 | 5/2010 |
| DE | 102012004000 A1 | 8/2013 |

(Continued)

*Primary Examiner* — Jared Fureman
*Assistant Examiner* — Michael J Warmflash
(74) *Attorney, Agent, or Firm* — Frank Lollo; Brooks Kushman P.C.

(57) ABSTRACT

Secured access to a vehicle is provided. A power input is configured to receive power from a source external to the vehicle. A voltage monitor is configured to measure voltage and/or state of health of a vehicle battery. An access component is configured to provide secured access to the vehicle. A processor is configured to, responsive to the voltage monitor indicating the vehicle battery is unable to power the access component, power the access component via the power input to allow the secured access to the vehicle despite the vehicle battery being depleted.

18 Claims, 5 Drawing Sheets

(56) References Cited

U.S. PATENT DOCUMENTS

| | | | |
|---|---|---|---|
| 2007/0103271 A1* | 5/2007 | King | B60R 25/403 340/5.72 |
| 2011/0163721 A1* | 7/2011 | Van Wiemeersch | H02J 9/002 320/128 |
| 2016/0060909 A1* | 3/2016 | Krishnan | E05B 81/86 292/194 |
| 2018/0118166 A1* | 5/2018 | Mueller | B60R 25/248 |
| 2019/0085600 A1* | 3/2019 | Leonardi | E05F 15/43 |
| 2020/0274386 A1* | 8/2020 | Kirleis | H02J 7/0029 |
| 2020/0395779 A1* | 12/2020 | Nam | H01M 10/48 |
| 2021/0006084 A1* | 1/2021 | Kikuchi | H02J 7/00302 |
| 2022/0194320 A1* | 6/2022 | Caron | E05B 81/82 |
| 2023/0050828 A1* | 2/2023 | Elangovan | G06F 3/014 |

FOREIGN PATENT DOCUMENTS

| | | |
|---|---|---|
| JP | 2005307742 A | 11/2005 |
| WO | 2019243701 A1 | 12/2019 |

* cited by examiner

LOW-POWER VEHICLE SECURE ACCESS

TECHNICAL FIELD

Aspects of the disclosure generally relate to approaches for providing secured access to a vehicle with a discharged battery.

BACKGROUND

Vehicles may employ various powered access mechanisms for unlocking and opening vehicle doors. As some examples, these access mechanisms may include keypads, near field communication (NFC) cards, and phone as a key (PaaK). Unlike mechanical keys, these mechanisms may require electrical power to operate. When the vehicle battery is depleted, these electronic mechanisms may be unable to function. As a result, the user may lose access to the vehicle cabin. The user may also lose access to the battery, preventing the user from recharging or replacing the battery to correct the issue.

SUMMARY

In a first illustrative example, a secured access system for a vehicle is provided. A power input is configured to receive power from a source external to the vehicle. A voltage monitor is configured to measure voltage and/or state of health of a vehicle battery. An access component is configured to provide secured access to the vehicle. A processor is configured to, responsive to the voltage monitor indicating the vehicle battery is unable to power the access component, power the access component via the power input to allow the secured access to the vehicle despite the vehicle battery being depleted.

In a second illustrative example, a method for secured access to a vehicle is provided. A voltage of a vehicle battery is received to a processor from a voltage monitor. Responsive to the processor indicating the voltage being unable to power an access component, the processor it utilized for transitioning from a normal mode in which the access component is powered by the vehicle battery and a power input is electrically isolated from the access component to a low power mode in which the power input is electrically connected for powering to the access component and the vehicle battery is electrically isolated from the access component.

In a third illustrative example, a system for secured access system for a vehicle is provided. A power input is configured to receive power from a source external to the vehicle. A voltage monitor is configured to measure voltage and/or state of health of a vehicle battery. An access component is provided. One or more first switching components are connected inline between the power input and the access component. One or more second switching components are connected inline between the vehicle battery and the access component. A processor is configured to responsive to the voltage monitor indicating the vehicle battery is unable to power the access component, transition from a normal mode in which the access component is powered by the vehicle battery and the power input is electrically isolated from the access component to a low power mode in which the power input is electrically connected for powering to the access component and the vehicle is electrically isolated from the access component, wherein in the normal mode, the processor is configured to control the one or more first switching components to electrically isolate the power input from the access component and to control the one or more second switching components to electrically connect the vehicle battery to the access component, and in the low power mode, the processor is configured to control the one or more first switching components to electrically connect the power input to the access component and to control the one or more second switching components to electrically isolate the vehicle battery from the access component.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When the battery is depleted, the electronic components for unlocking and opening the doors may not function. To address these conditions, a power input may be provided on the exterior of the vehicle. This input may be used to provide limited electrical power to the components that enable vehicle access. By powering these components, the vehicle may be able to authenticate and verify a user request to unlock a door and/or actuate a door unlock. This external powering of the components may allow a user to gain access to the vehicle despite the vehicle battery being depleted.

Additional circuitry may be implemented to ensure isolation of the access components as well as to avoid issues with shorts or excessive power being provided to the power input. For example, the internal battery of the vehicle may be electrically isolated from the external power input in situations where the components are being powered from the external source. Additionally, components of the vehicle unrelated to vehicle access may be isolated from the power input. This isolation may minimize the amount of power required to unlock the door. Yet further, the power input may be isolated from the vehicle battery during circumstances where the internal battery has adequate power to allow for access to the vehicle. Further aspects of the disclosure are discussed in detail herein.

Figure 1:
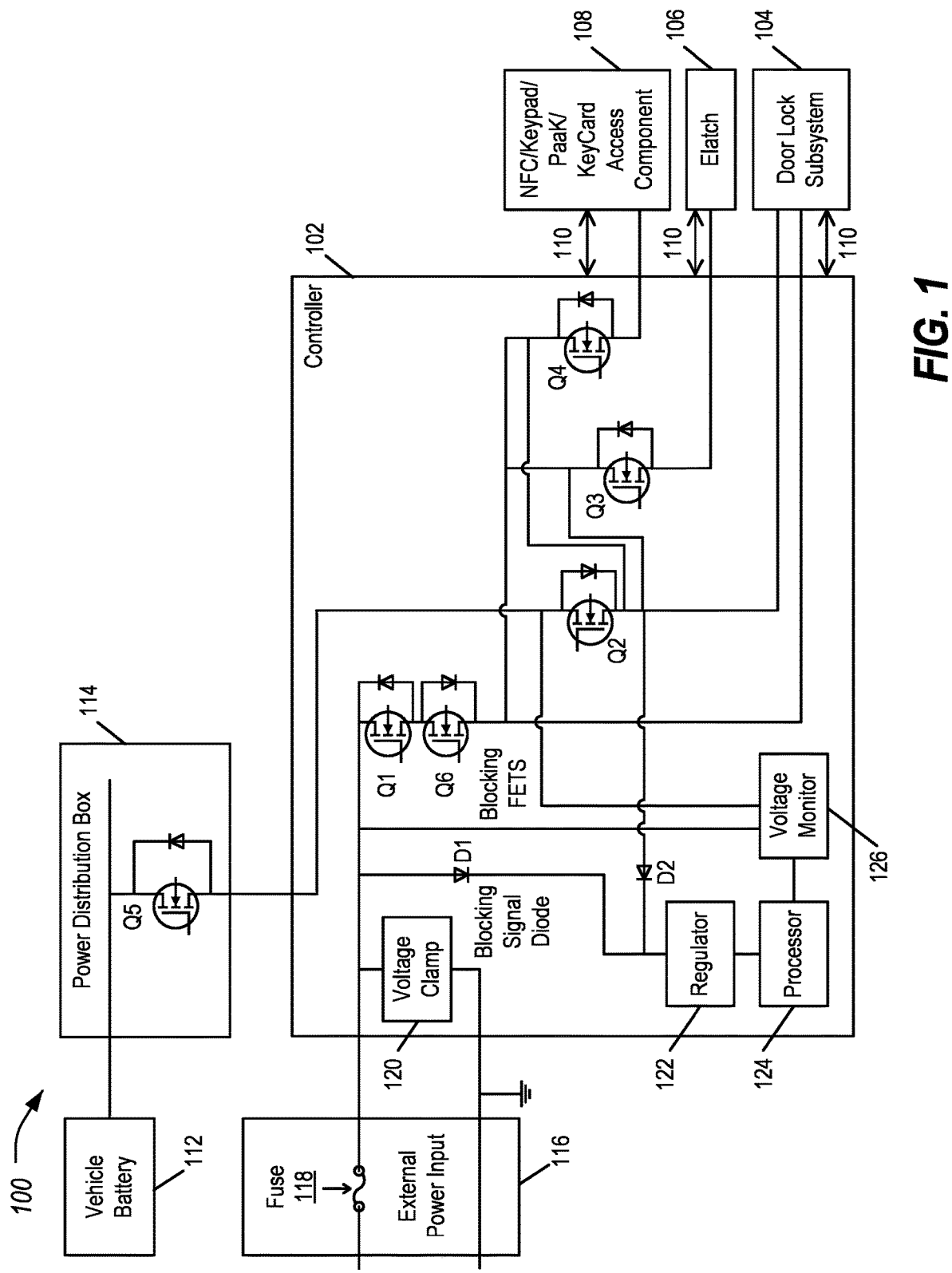
FIG. 1 illustrates an example of a vehicle configured for providing secure access in low power conditions.

FIG. 1 illustrates an example of a vehicle 100 for providing secure access in low power conditions. A controller 102 of the vehicle 100 may be used to power operation of access functionality of the vehicle 100. This functionality may include, as some examples, a door lock subsystem 104, an e-latch 106 system, and/or an NFC access/keypad component 108. These components may typically be powered by a vehicle battery 112 via a power distribution box 114. A power input 116 may also be provided on the exterior of the vehicle 100. The power input 116 may be accessible from outside the vehicle 100 to allow a user to connect an external power source. This external power source may be a relatively low power source, such as a battery.

In a normal powered mode, the vehicle battery 112 has power to allow for access to the vehicle 100. In the normal powered mode, the controller 102 may be powered by the vehicle battery 112 via a power distribution box 114. As explained in detail below, the power input 116 may be isolated from the vehicle battery 112 in the normal powered mode.

In a low power mode, the vehicle battery 112 is depleted to a point where the vehicle battery 112 may no longer be able to allow for access to the vehicle 100. In the low power mode, the controller 102 may instead be powered via the power input 116. In this low power mode, the internal battery of the vehicle 100 may be isolated from the external power input 116 to avoid the power input 116 back-feeding to the vehicle battery 112. Additionally, components unrelated to access to the vehicle 100 may be isolated from being powered by the power input 116. This isolation may minimize the amount of power required to be provided via the power input 116 unlock the door. By receiving power via the power input 116, the controller 102 may be able to authenticate and verify a user request to unlock a door and/or actuate a door unlock, despite the vehicle battery 112 being depleted. Additionally, security and access protocols may remain in operation despite the vehicle battery 112 being depleted, such that the same validation is performed as during the normal powered mode to allow the access to the vehicle 100.

The controller 102 and power distribution box 114 may additionally include circuitry to provide for the switching between the normal powered mode and the low power mode. Specifically, the circuitry may include a signal diode D1, a blocking diode D2, and MOSFETs Q1, Q2, Q3, Q4, Q5, and Q6.

As shown, Q1 and Q6 form a back-to-back MOSFET pair or relay. The drain of Q1 may be connected to the power input 116, and the source of Q1 may be connected to the source of Q6. The drain of Q6 may be connected to the door lock subsystem 104, to the power bus from the power distribution box 114, as well as to the drains of Q3 and Q4. A function of Q1 is to selectively provide isolated power to the controller 102, door lock subsystem 104, e-latch 106 and access/keypad component 108. A function of Q6 is to block voltage back to the power input 116 during normal operation. When Q1 is turned on, power may be applied to the door lock subsystem 104, where the door lock subsystem 104 may include a microcontroller that controls H-Bridge drivers for each of the door locks. Also when on, Q1 may also pass power to the Q3 and Q4 latching MOSFETs.

Q2 may be a blocking MOSFET connected in source to drain configuration. Q2 may accordingly serve to block a battery or other device connected to the power input 116 from back feeding into the vehicle battery 112. The body diode of Q2 may be forward biased between the source and the drain of Q2 when Q2 is not switched on. The source of Q2 may be connected to vehicle battery 112 via Q5 in the power distribution box 114. Q5 may also be a fuse, or fuse relay combination.

The door lock subsystem 104 may receive various power feeds. As shown, there are two power feeds to the door lock subsystem 104: one via external charge port via Q1, Q6 and the other via the drain of Q2. In the illustrated example, Q3 is a latching MOSFET that is turned on to provide power to vehicles 100 with an e-latch 106 system.

The e-latch 106 system may be an electronically controlled latch using a solenoid or other electrically-controlled actuator, as opposed to a mechanically-controlled latch such as a routable key. Q3 may also be a fuse in another example. The e-latch 106 controls the latch mechanism of the doors of the vehicle 100 that open the door. By opening the door, a user may be provided access to the interior of the vehicle 100.

Similarly, Q4 may be a latching MOSFET that provides power to the access/keypad component 108. The access/keypad component 108 may be responsible for security and access to the vehicle 100. The access/keypad component 108 may authenticate and verify user request to unlock the door via various access technologies, such as NFC cards, a numeric keypad, radio frequency (RF) key fobs, and Phone as a Key. Upon verification from a user, the access/keypad component 108 may send an unlock command to the controller 102, which, in turn commands the door lock/unlock motors to unlock the vehicle 100 via the door lock subsystem 104 and/or the e-latch 106. In an example, these commands may be provided on a private vehicle network 110 (e.g., controller area network flexible data-rate (CAN-FD)) between the access/keypad component 108 and the controller 102. This vehicle network 110 may implement signal authentication and security measures, for example. The controller 102 may receive a message from the vehicle network 110 and proceed to activate the door unlock command via the door lock subsystem 104. To minimize maximum current draw the door unlocks may be limited to only a driver door, or, in another example, to sequence the remaining doors consecutively. An optional annunciator may be implemented as well, for example, to provide an audible beep upon the access/keypad component 108 powering up. This may notify the customer they can try to access the vehicle 100 via NFC card, keypad, key fob, PaaK, etc. Upon the door being unlocked, the customer may access the vehicle battery, which may be in the front or rear trunk (or even under a seat in the cabin), and charge or replace the vehicle battery 112.

The signal diode D1 may be configured to provide power to pass from the power input 116 to a voltage regulator 122 which in turn powers a processor 124. This power passing via D1 may be of relatively low current as compared to the power provided to other components such as the door lock subsystem 104, e-latch 106, and NFC access/keypad component 108. When powered via the power input 116 through D1, the processor 124 may be configured to read voltage measurements from a voltage monitor 126. As shown, the voltage monitor 126 is configured to monitor the voltage at Q2. Additionally or alternately, the voltage monitor 126 may be used to monitor the state of health of the vehicle battery 112. For instance, the state of health may indicate a ratio or other measure of the maximum battery charge of the vehicle battery 112 as compared to its rated capacity. A low battery condition (e.g., below a minimum voltage threshold) and/or a state of health below a threshold amount (e.g., a threshold percentage of rated capacity) may indicate that the vehicle battery 112 is no longer usable for accessing the vehicle 100.

The diode D2 may be configured to block the battery or other power device connected to the power input 116 from back feeding into the locking circuits protected by Q3 and Q4. As shown, the diode D2 is connected to the source of Q2.

Figure 2:
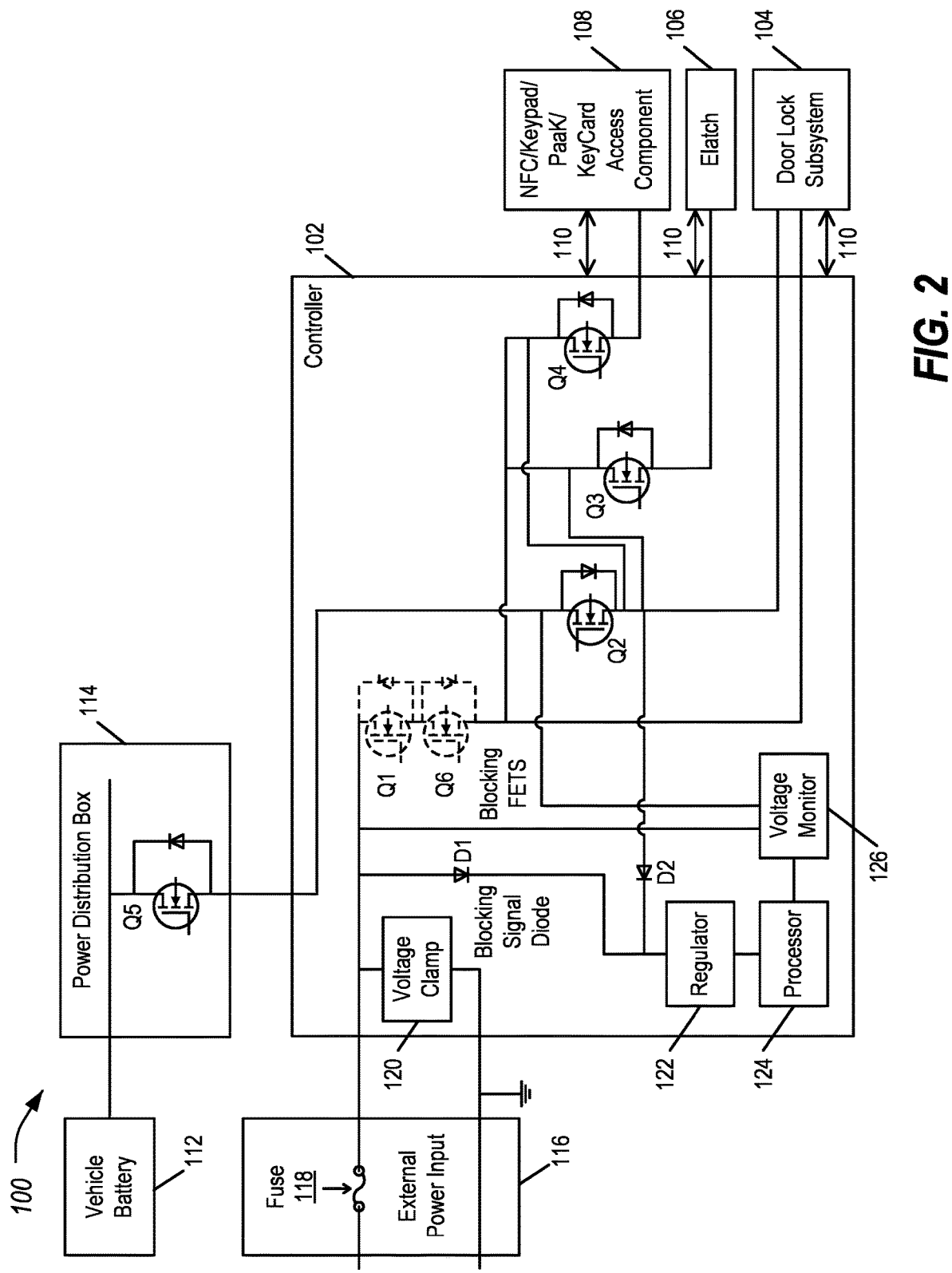
FIG. 2 illustrates the operation of the vehicle in the normal powered mode.

FIG. 2 illustrates the operation of the vehicle 100 in the normal powered mode. Power to the processor 124 of the controller 102, to Q3, and to Q4 is provided through the Q5 latching MOSFET in the power distribution box 114 and through Q2 in the controller 102.

When the vehicle 100 is in an active power mode (e.g., RUN or START), Q2 blocking MOSFET is turned on in the active state to minimize voltage drop. When the processor 124 is in a SLEEP or OFF state, Q2's body diode is forward biased. Here, power is provided to the processor 124, to Q4, and to Q3 through the body diode of the blocking MOSFET Q2. During this state there may be a 0.7 to 1 voltage drop across the body diode to these devices. The voltage drop should be insignificant since this a low current state and the downstream devices will be tolerable to this.

Also in the active mode, Q1 and Q6 may be deactivated, to prevent the power inputs 116 from being powered by the vehicle battery 112. This disconnection is shown in FIG. 2 by the representation of Q1 and Q6 in dotted line.

Figure 3:
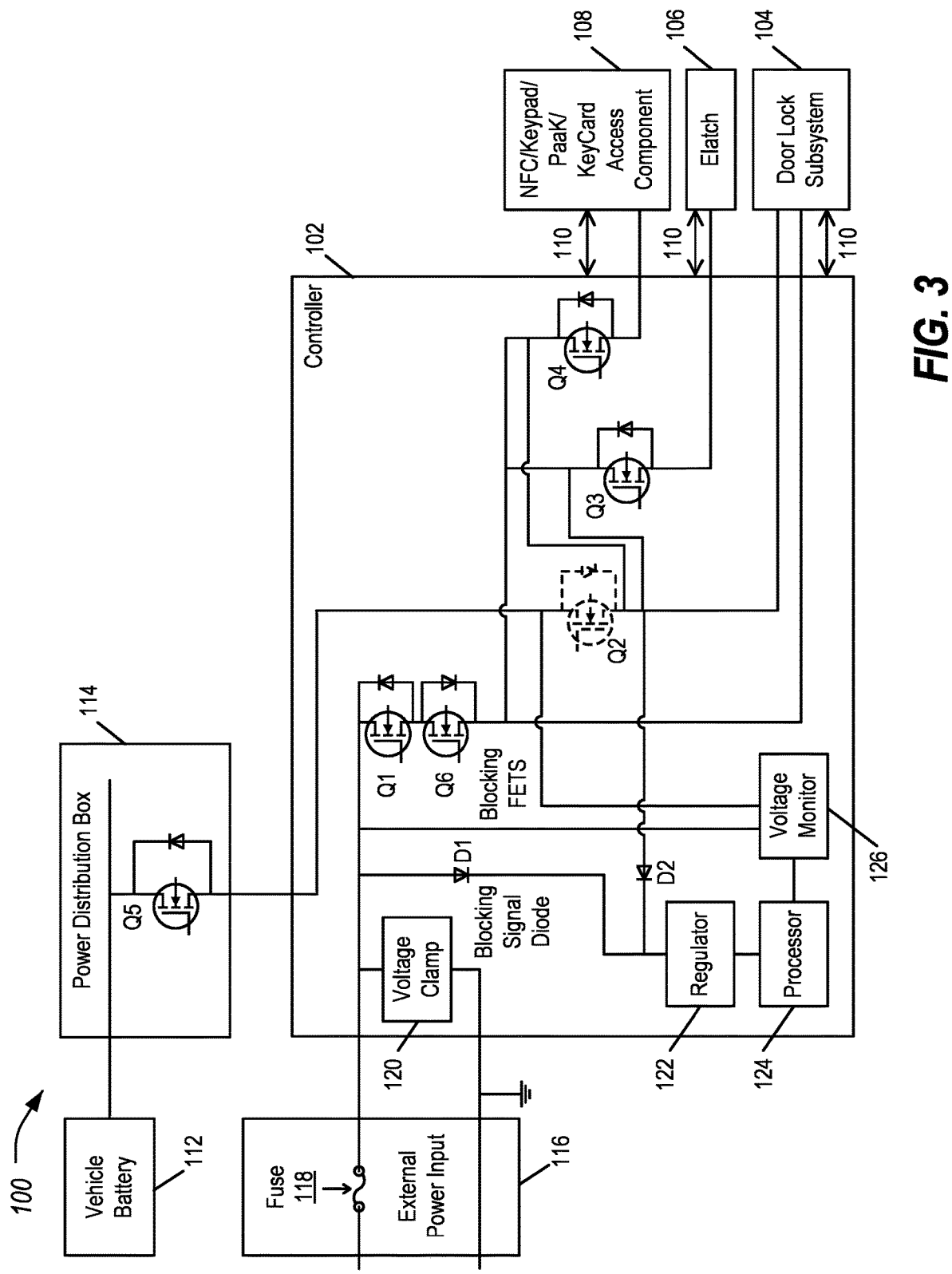
FIG. 3 illustrates the operation of the vehicle in the low power mode.

FIG. 3 illustrates the operation of the vehicle 100 in the low power mode. Q2 is still an active component in this state. The Q2 body diode is forward biased providing power to the processor via D2, Q3, Q4 and the locking/unlocking subsystem. As noted above, if the vehicle battery 112 becomes depleted below a voltage threshold or becomes below the state of health threshold, then the controller 102 and other components of the vehicle 100 may be unable to power up and unlock the doors. Moreover, in some vehicles 100 with an electronic hood latch the vehicle battery 112 may be inaccessible without a minimum of power. Thus, the user may be unable to jump start the vehicle 100 as the hood cannot be opened.

In such a situation, a user may provide power to the power inputs 116. In an example, the power input 116 may be an external 12-volt port. In one non-limiting example, the power input 116 may provide an electrical connector having +/−12-volt pins. The power input 116 may be able to operate with a relatively low current capacity as compared to the full current draw of the vehicle 100. For instance, the power input 116 may be designed to operate with a maximum load or transient current of 5-10 Amps.

Power may be fed from the power input 116 to substantially only the voltage regulator 122 of the controller 102 through blocking diode D1, limiting power to other devices until authentication is completed. The processor 124 may receive the power, wake up, and check the voltage monitor 126 to determine if the vehicle battery 112 is depleted. Responsive to detecting the depleted vehicle battery 112, the processor 124 may cause the controller 102 to transition into the low power mode. In the low power mode, only components for security and access control are powered. Upon entering this state, the back-to-back MOSFETs Q1, Q6 may both be activated on in a low resistance state. Additionally, in the second state Q2 is turned off, thereby eliminating back-feeding to the vehicle battery 112.

With continuing reference to FIGS. 1-3, the power input 116 may optionally include a fuse 118 inline with the power input 116. The fuse 118 may be useful in case of an accidental or intentional application of excess power to the power input 116. In an example, in a traditional low-voltage negative ground system, the fuse 118 may be inline with the positive terminal of the power input 116, with the negative input being tied to the vehicle 100 chassis as ground. This fuse 118 may be added in series with the powered line to prevent shorts. A short may potentially occur if the two terminals of the power input 116 are connected together. If this condition were to occur, the diode D1 and the MOSFET Q6 may collectively block the power from the vehicle battery 112 from back feeding into the power input 116, thereby preventing the short circuit condition at the power input 116.

Additionally or alternately, the power input 116 may further pass through a voltage clamp 120 configured to avoid unwanted transients or over voltage conditions. For instance, a high voltage supply that could damage the vehicle 100 electronics may inadvertently or intentionally be applied to the power input 116. To prevent this an optional voltage clamp 120 may be added in the controller 102 between the hot and ground of the power input 116. For instance, the controller 102 may include a voltage clamp 120 including a Zener with a bleed off MOSFET and/or resistor to mitigate any excessive high voltage that may be inadvertently or intentionally applied to the power input 116.

Figure 4:
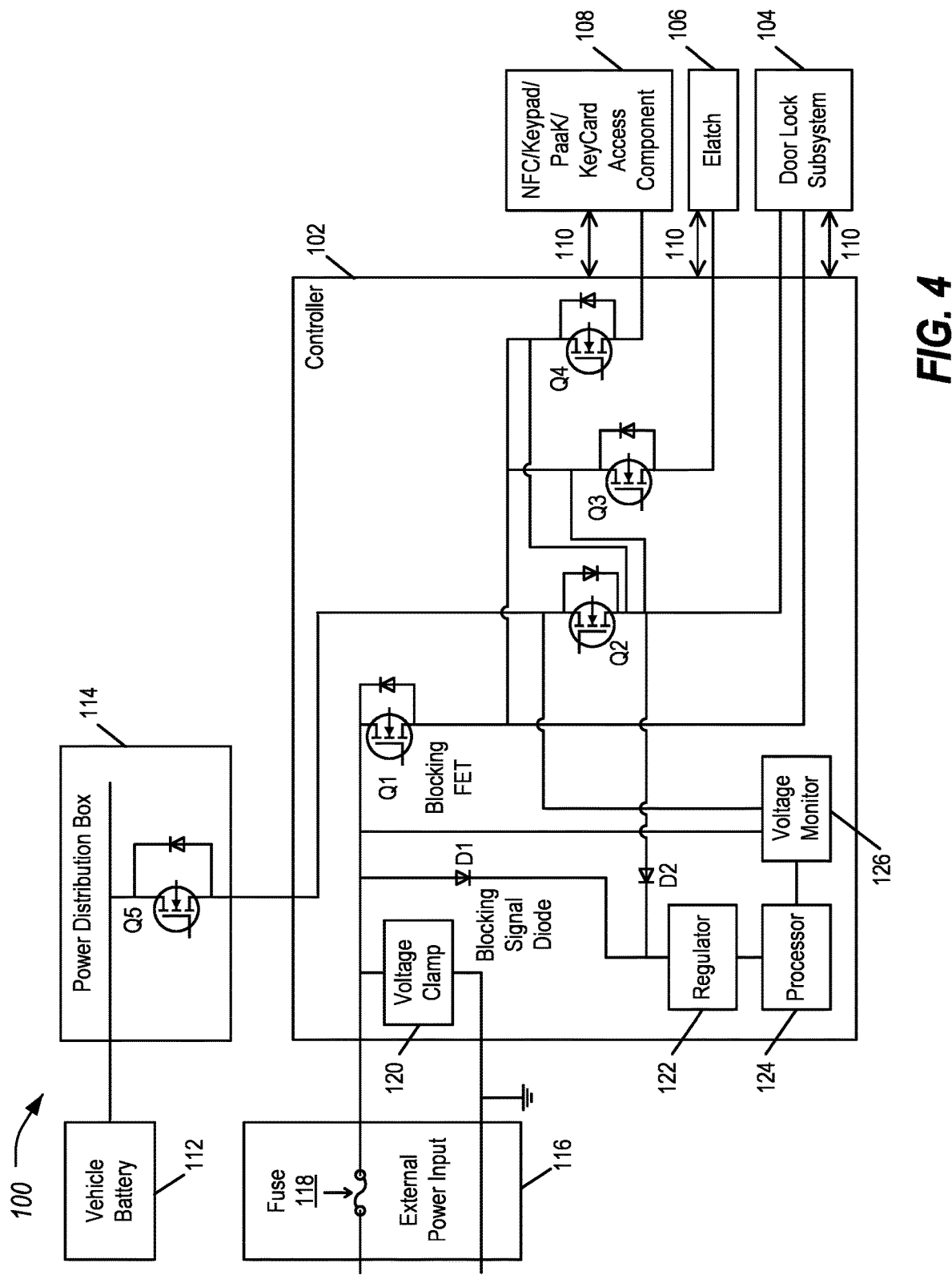
FIG. 4 illustrates a variation on the vehicle of FIG. 1, using only a single metal-oxide-semiconductor field-effect transistor (MOSFET) in place of the back-to-back MOSFETs.

FIG. 4 illustrates a variation on the vehicle 100 of FIG. 1, using only a single MOSFET Q1 in place of the back-to-back MOSFETs Q1 and Q6. In this variation, short conditions may be protected using the fuse 118. For instance, a resettable fuse 118 may be used, such as a resettable positive temperature coefficient (PTC) device. Thus, in some examples Q1/Q6 may be optional, depending on the desire for back-feed protection and/or reverse battery protection.

Figure 5:
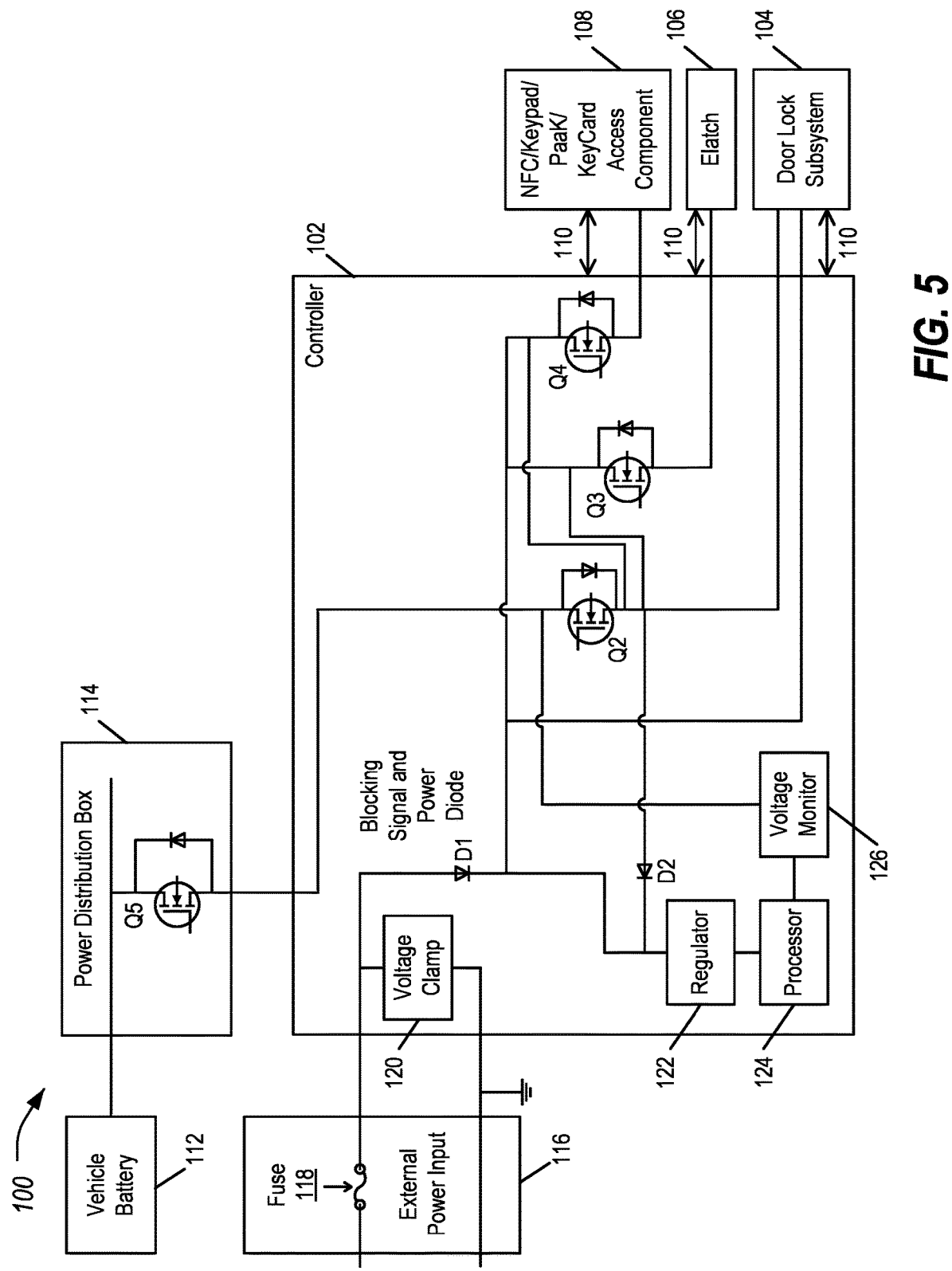
FIG. 5 illustrates a variation on the vehicle of FIG. 1, avoiding use of both back-to-back MOSFETs.

FIG. 5 illustrates another variation on the vehicle 100 of FIG. 1, avoiding use of the back-to-back MOSFETs Q1 and Q6. In this variation, the diode D1, and the back-to-back MOSFETs Q1, Q6 are consolidated into the single diode D1. In such a variation, in the low power mode there may be a drop of about one volt across the D1. However, this voltage drop would be acceptable to allow for the functioning of the controller 102.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A secured access system for a vehicle, comprising:
   a power input configured to receive power from a source external to the vehicle;
   a voltage monitor configured to measure voltage and/or state of health of a vehicle battery;
   an access component configured to provide secured access to the vehicle;
   a first switch electrically connected between the vehicle battery and the access component;
   a second switch electrically connected between the power input and the access component; and
   a processor configured to, responsive to the voltage monitor indicating the vehicle battery is unable to power the access component, open the first switch to electrically disconnect the vehicle battery from the access component, and close the second switch to electrically connect the power input to the access component, thereby transitioning from a normal mode in which the access component is powered by the vehicle battery and the power input is electrically isolated from the access component to a low power mode in which the power input is electrically connected for powering the access component and the vehicle battery is electrically isolated from the access component.

2. The secured access system of claim 1, wherein the access component includes one or more of a door lock subsystem, an e-latch subsystem, and/or an access/keypad authenticator component.

3. The secured access system of claim 1, wherein the first switch and/or the second switch includes a back-to-back metal-oxide-semiconductor field-effect transistor (MOSFET) pair.

4. The secured access system of claim 1, wherein, in the normal mode, the processor is further configured to electrically connect the vehicle battery to the access component by controlling one or more second switches or relays inline between the vehicle battery and the access component.

5. The secured access system of claim 1, wherein the first switch includes one or more MOSFETs inline between the vehicle battery and the access component, wherein, in the low power mode, the processor is further configured to electrically isolate the vehicle battery from the access component by controlling the one or more MOSFETs.

6. The secured access system of claim 5, wherein the second switch includes one or more second MOSFETs inline between the power input and the access component, and in the low power mode, the processor is further configured to electrically connect the power input to the access component by controlling the one or more second MOSFETs.

7. The secured access system of claim 1, wherein, the processor is configured to be powered by the vehicle battery in the normal mode and by the power input in the low power mode.

8. The secured access system of claim 1, wherein the power input is connected to the processor through a blocking diode to prevent power from the vehicle battery from back feeding into the power input.

9. The secured access system of claim 1, wherein the power input is connected to the processor and to the access component through a blocking diode to prevent power from the vehicle battery from back feeding into the power input.

10. The secured access system of claim 1, further comprising one or more of:
    a fuse, inline with the power input, configured to trip responsive to a short of the power input; and
    a voltage clamp wired between hot and ground of the power input to mitigate power above a high voltage threshold applied to the power input.

11. A method for secured access to a vehicle, comprising:
    receiving, by a processor, a voltage of a vehicle battery from a voltage monitor; and
    responsive to the processor indicating the voltage being unable to power an access component, utilizing the processor for opening a first switch electrically connected between the vehicle battery and the access component to electrically disconnect the vehicle battery from the access component, and closing a second switch electrically connected between a power input and the access component to electrically connect the power input to the access component, thereby transitioning from a normal mode in which the access component is powered by the vehicle battery and the power input is electrically isolated from the access component to a low power mode in which the power input is electrically connected for powering to the access component and the vehicle battery is electrically isolated from the access component.

12. The method of claim 11, wherein the second switch includes one or more first MOSFETs inline between the power input and the access component and the first switch includes one or more second MOSFETs inline between the vehicle battery and the access component, and further comprising, in the normal mode:
    electrically isolating the power input from the access component by the processor controlling the one or more first MOSFETs; and
    electrically connecting the vehicle battery to the access component by the processor controlling the one or more second MOSFETs.

13. The method of claim 12, further comprising, in the low power mode:
    electrically connecting the power input to the access component by the processor controlling the one or more first MOSFETs inline between the power input and the access component; and
    electrically isolating the vehicle battery from the access component by the processor controlling the one or more second MOSFETs inline between the vehicle battery and the access component.

14. The method of claim 11, further comprising powering the processor from the power input and from the vehicle battery.

15. A system for secured access for a vehicle, comprising:
a power input configured to receive power from a source external to the vehicle;
a voltage monitor configured to measure voltage and/or state of health of a vehicle battery;
an access component configured to provide secured access to the vehicle;
one or more first switching components, electrically connected inline between the power input and the access component;
one or more second switching components, electrically connected inline between the vehicle battery and the access component; and
a processor configured to
responsive to the voltage monitor indicating the vehicle battery is unable to power the access component, transition from a normal mode in which the access component is powered by the vehicle battery and the power input is electrically isolated from the access component to a low power mode in which the power input is electrically connected for powering to the access component and the vehicle battery is electrically isolated from the access component, wherein
in the normal mode, the processor is configured to control the one or more first switching components to electrically isolate the power input from the access component and to control the one or more second switching components to electrically connect the vehicle battery to the access component, and
in the low power mode, the processor is configured to control the one or more first switching components to electrically connect the power input to the access component and to control the one or more second switching components to electrically isolate the vehicle battery from the access component.

16. The secured access system of claim 15, wherein, the processor is configured to be powered by the vehicle battery in the normal mode and by the power input in the low power mode.

17. The secured access system of claim 15, wherein the power input is connected to the processor through a blocking diode to prevent power from the vehicle battery from back feeding into the power input.

18. The secured access system of claim 15, further comprising:
a fuse inline with the power input configured to trip responsive to a short of the power input; and
a voltage clamp wired between hot and ground of the power input to mitigate power above a high voltage threshold applied to the power input.

* * * * *